US012571647B2

(12) United States Patent (10) Patent No.: US 12,571,647 B2

Menta et al. (45) Date of Patent: Mar. 10, 2026

(54) STACKED ROADWAY DETECTION SYSTEM AND METHOD

(71) Applicant: GM Global Technology Operations LLC, Detroit, MI (US)

(72) Inventors: Gopinath Menta, Canton, MI (US); Curtis L. Hay, Petoskey, MI (US); Iqbal M. Surti, Troy, MI (US); Janak kumar Dundigalla, Sterling Heights, MI (US); Gaurav Talwar, Novi, MI (US); Austin Lipinski, Houston, TX (US); Todd Lee Chaney, Austin, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 173 days.

(21) Appl. No.: 18/495,462

(22) Filed: Oct. 26, 2023

(65) Prior Publication Data

US 2025/0137812 A1 May 1, 2025

(51) Int. Cl.
  *G01C 21/00* (2006.01)
  *G01C 5/06* (2006.01)
(52) U.S. Cl.
  CPC ........... *G01C 21/3844* (2020.08); *G01C 5/06* (2013.01)
(58) Field of Classification Search
  CPC .............................. G01C 21/3844; G01C 5/06
  See application file for complete search history.

(56) References Cited

U.S. PATENT DOCUMENTS

| | | | |
|---|---|---|---|
| 8,521,427 B1 * | 8/2013 | Luyks ................. | G01S 5/02529 |
| | | | 340/426.2 |
| 2008/0091352 A1 * | 4/2008 | O'Hare .................. | G08G 1/163 |
| | | | 340/436 |
| 2013/0133421 A1 | 5/2013 | Katz | |
| 2020/0143680 A1 * | 5/2020 | Max ..................... | G08G 1/0141 |
| 2021/0190499 A1 * | 6/2021 | Palella .................. | G01C 25/00 |
| 2021/0302996 A1 * | 9/2021 | Antcliffe .......... | G08G 1/096811 |
| 2021/0364380 A1 | 11/2021 | Blaha, Jr. et al. | |
| 2023/0202509 A1 * | 6/2023 | Fowe ................. | G01C 21/3815 |
| | | | 701/25 |
| 2023/0245569 A1 | 8/2023 | Ahmed et al. | |

FOREIGN PATENT DOCUMENTS

WO    WO-2014176464 A1    10/2014

* cited by examiner

*Primary Examiner* — Hunter B Lonsberry
*Assistant Examiner* — Besufekad Lemma Tessema
(74) *Attorney, Agent, or Firm* — Honigman LLP; Matthew H. Szalach; Jonathan P. O'Brien

(57) ABSTRACT

A system includes data processing hardware and memory hardware in communication with the data processing hardware, the memory hardware storing instructions that when executed on the data processing hardware cause the data processing hardware to perform operations including inputting cellular range data, barometric sensor data, GNSS data, and automotive inertial data into a Kalman filter and outputting from the Kalman filter an estimate of elevation distance of a vehicle based on the cellular range data, the barometric sensor data, the GNSS data, and the automotive inertial data.

20 Claims, 3 Drawing Sheets

STACKED ROADWAY DETECTION SYSTEM AND METHOD

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to detecting a vehicle position and, more particularly, to detecting a vehicle position on a stacked roadway.

Stacked roadways are ubiquitous across the United States. Such roadways are often found in and around highways and expressways to permit vehicle travel in multiple directions without requiring vehicles to stop at intersections. For example, a highway having lanes running in a north and south direction may cross a road or another highway having lanes that run in an east and west direction. In an effort to prevent traffic from stopping on any of the roadways, the northbound and southbound lanes may extend over or under the eastbound and westbound lanes. As can be appreciated, over the course of a highway, numerous roads and/or highways may need to be routed over or under one another to permit continuous traffic flow.

Stacked roadways may also be present for vehicles traveling between two intersecting roadways. In the example provided above, if a vehicle wishes to move from a northbound lane to an eastbound lane, the vehicle does not come to a stop in order to permit the vehicle to turn off of the northbound lane and onto the eastbound lane. Rather, the vehicle takes an exit/entrance ramp extending between the northbound land and the eastbound lane. The exit/entrance ramp allows the vehicle to change from one roadway to another roadway without having to stop. In so doing, however, the vehicle often needs to make a change in elevation, as one of the roadways may be above or below the other roadway.

Conventional vehicles are easily navigated on stacked highways where drivers are trained and understand how to navigate amongst various elevated and/or stacked roadways. However, for autonomously driven vehicles, determining a precise location of a vehicle, and knowledge regarding the road on which the vehicle is traveling, are paramount to ensure that the vehicle continues to travel along its intended path and can reach its intended destination. For example, if a controller associated with an autonomously driven vehicle believes a vehicle is traveling on the third of three stacked highways but the vehicle is actually traveling on the second of the three stacked highways, the controller may cause the vehicle to make an incorrect turn, which could result in the vehicle going in the wrong direction and/or encountering an obstruction that the particular vehicle may not be able to navigate. Namely, if the controller is not aware that the vehicle is on the second of the three stacked highways, and the vehicle happens to be a delivery truck with a cab and box trailer, the controller may not be aware that the box trailer can't fit under the third stacked highway when the second stacked highway crosses the third stacked highway. This error in knowing precisely the road on which the vehicle is traveling may therefore result in damage to the vehicle and/or the stacked highways on which the vehicle is traveling.

The location of an autonomous vehicle may be determined by outfitting an autonomously driven vehicle with a three-axis accelerometer and a three-axis gyro sensor. However, such sensors are not readily found on conventional vehicles and, further, are complex and costly. A more cost-efficient method of determining a vehicle position on a stacked roadway includes comparing wheel odometry against a unit of distance to calculate road slope. While this method reduces the costs associated with providing a vehicle with a three-axis accelerometer and a three-axis gyro sensor, the resulting data is not as reliable as the sensor data. Accordingly, a need exists to be able to accurately determine a position of a vehicle on a stacked highway to not only improve the ability of an autonomously driven vehicle to navigate such roadways but, also, to aid conventional vehicles in knowing the exact position of a vehicle to warn a driver of a potential hazard (i.e., a low bridge or stacked highway) and/or to provide accurate information via a navigation system.

SUMMARY

In one configuration, a system is provided and includes data processing hardware and memory hardware in communication with the data processing hardware, the memory hardware storing instructions that when executed on the data processing hardware cause the data processing hardware to perform operations including inputting cellular range data, barometric sensor data, GNSS data, and automotive inertial data into a Kalman filter and outputting from the Kalman filter an estimate of elevation distance of a vehicle based on the cellular range data, the barometric sensor data, the GNSS data, and the automotive inertial data.

The system may include one or more of the following optional features. For example, the system may include a barometric sensor associated with the vehicle. The barometric sensor may be in communication with the data processing hardware and may provide the data processing hardware with the barometric sensor data, the barometric sensor data indicative of an altitude of the vehicle.

In one configuration, the automotive inertial data may include at least one of pitch, roll, and yaw.

Inputting the cellular range data, the barometric sensor data, the GNSS data, and the automotive inertial data into the Kalman filter may include inputting the cellular range data, the barometric sensor data, the GNSS data, and the automotive inertial data for the vehicle traveling within a predetermined segment of a roadway. The Kalman filter may compare the estimate of elevation distance of the vehicle output with other estimates of elevation distance output by the Kalman filter for other vehicles traveling within the predetermined segment of the roadway. The comparison may be provided to the Kalman filter to refine the Kalman filter. Finally, a map database may be updated based on the comparison.

In another configuration, a system is provided and includes data processing hardware and memory hardware in communication with the data processing hardware, the memory hardware storing instructions that when executed on the data processing hardware cause the data processing hardware to perform operations including providing a plurality of inputs to a Kalman filter, the inputs related to a location of a vehicle on a predetermined segment of a roadway, estimating an elevation of the vehicle on the predetermined segment of the roadway using the Kalman filter based on the plurality of inputs, providing a plurality of estimated vehicle elevations for a plurality of other vehicles traveling on the predetermined segment of the roadway to the Kalman filter, comparing the estimate of elevation of the vehicle to the plurality of estimated vehicle elevations for the plurality of other vehicles, and refining the Kalman filter based on the comparison.

The system may include one or more of the following optional features. For example, one of the plurality of inputs to the Kalman filter may be cellular range data, barometric sensor data, GNSS data, and/or automotive inertial data. The automotive inertial data may include at least one of pitch, roll, and yaw.

In one configuration, a maps database may be updated based on the comparison.

In yet another configuration, a system is provided and includes data processing hardware and memory hardware in communication with the data processing hardware, the memory hardware storing instructions that when executed on the data processing hardware cause the data processing hardware to perform operations including inputting cellular range data, barometric sensor data, GNSS data, and automotive inertial data into a Kalman filter, estimating an elevation of the vehicle on a predetermined segment of a roadway using the Kalman filter based on the cellular range data, the barometric sensor data, the GNSS data, and the automotive inertial data, providing a plurality of estimated vehicle elevations for a plurality of other vehicles traveling on the predetermined segment of the roadway to the Kalman filter, comparing the estimate of elevation of the vehicle to the plurality of estimated vehicle elevations for the plurality of other vehicles, and refining the Kalman filter based on the comparison.

The system may include one or more of the following optional features. For example, the automotive inertial data may include at least one of pitch, roll, and yaw.

In one configuration, a maps database may be updated based on the comparison.

Estimated vehicle elevations for the plurality of other vehicles may be matched to the predetermined segment of the roadway. Matching the estimated vehicle elevations for the plurality of other vehicles to the predetermined segment of the roadway may include using a Markov Model.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
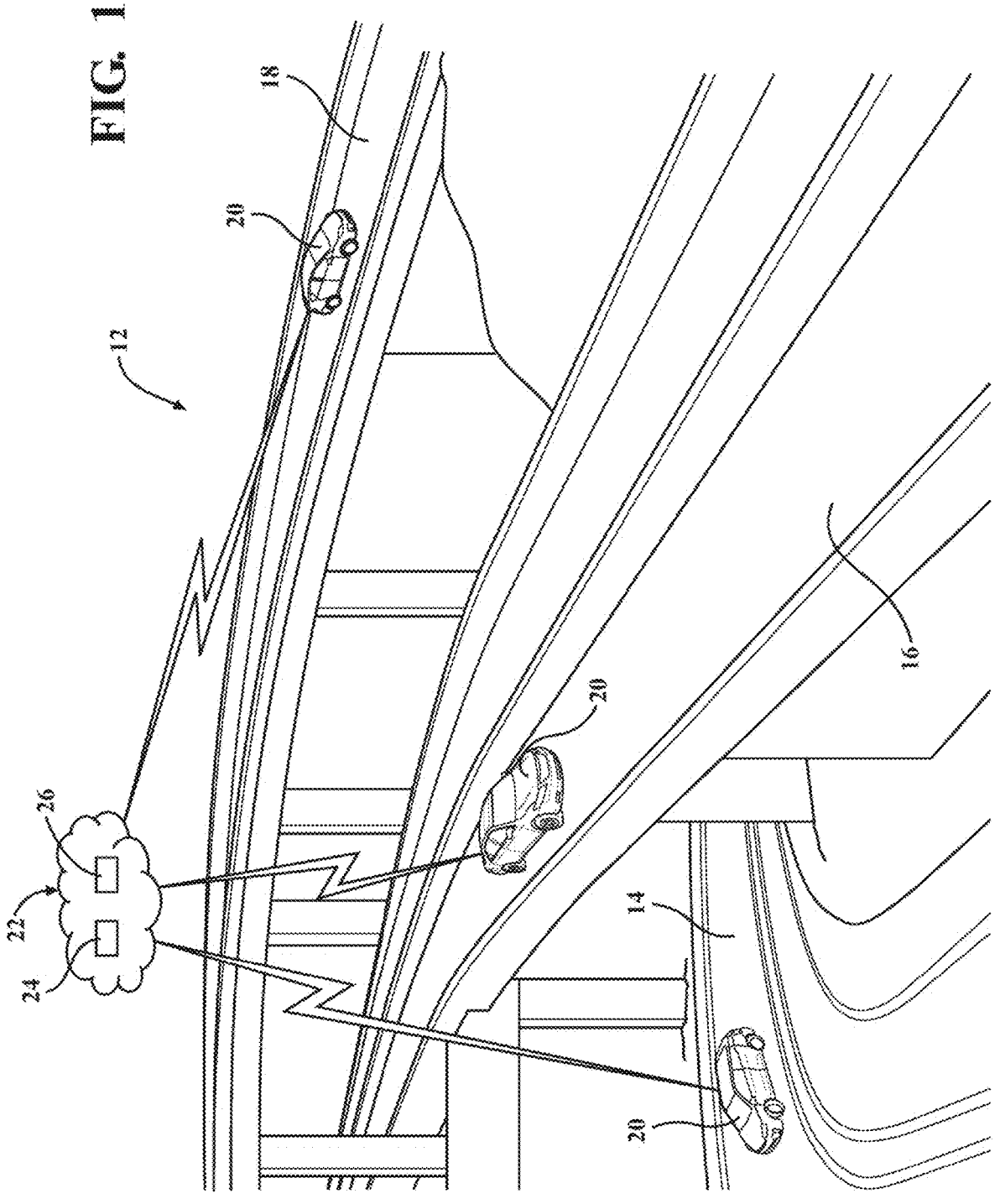
FIG. 1 is a schematic representation of a stacked roadway showing vehicles traveling on roadways of the stacked roadways and in communication with a cloud-based computer.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises." "comprising," "including," and "having." are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on." "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second." "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below; the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

With particular reference to FIGS. 1-4, a stacked roadway detection system 10 is provided for use in conjunction with a stacked roadway 12. As shown in FIG. 1, the stacked roadway 12 may include a first or lowermost roadway 14, a second or middle roadway 16, and a third or highest roadway 18. The stacked roadway 12 shown in FIG. 1 is exemplary. Accordingly, the stacked roadway detection system 10 could be used in conjunction with vehicles 20 traveling on a stacked roadway having fewer or more roadways and/or with roadways that cross one another in a different configuration than the configuration shown in FIG. 1. Finally, The stacked roadway detection system 10 may be used with an conventional, human-driven vehicle 20 or with a partially or fully autonomously driven vehicle 20. The vehicles 20—whether conventional or autonomously driven—may be powered by an internal combustion engine (ICE), may be an electric vehicle (EV) powered by one or more electric motors, or a hybrid electric vehicle (HEV) powered by an ICE and one or more electric motors.

The stacked roadway detection system 10 may be implemented in a cloud-based computer 22 having memory hardware 24 and processing hardware 26. The memory hardware 24 may store operating parameters and instructions that when executed by the processing hardware 26 allow the stacked roadway detection system 10 to determine an elevation of a particular vehicle 20 and, further, the roadway on which the vehicle 20 is traveling. In the example shown in FIG. 1, the stacked roadway detection system 10 is able to use the determined elevation of the vehicle 20 to determine whether the vehicle 20 is traveling on the first roadway 14, the second roadway 16, or the third roadway 18.

Figure 4:
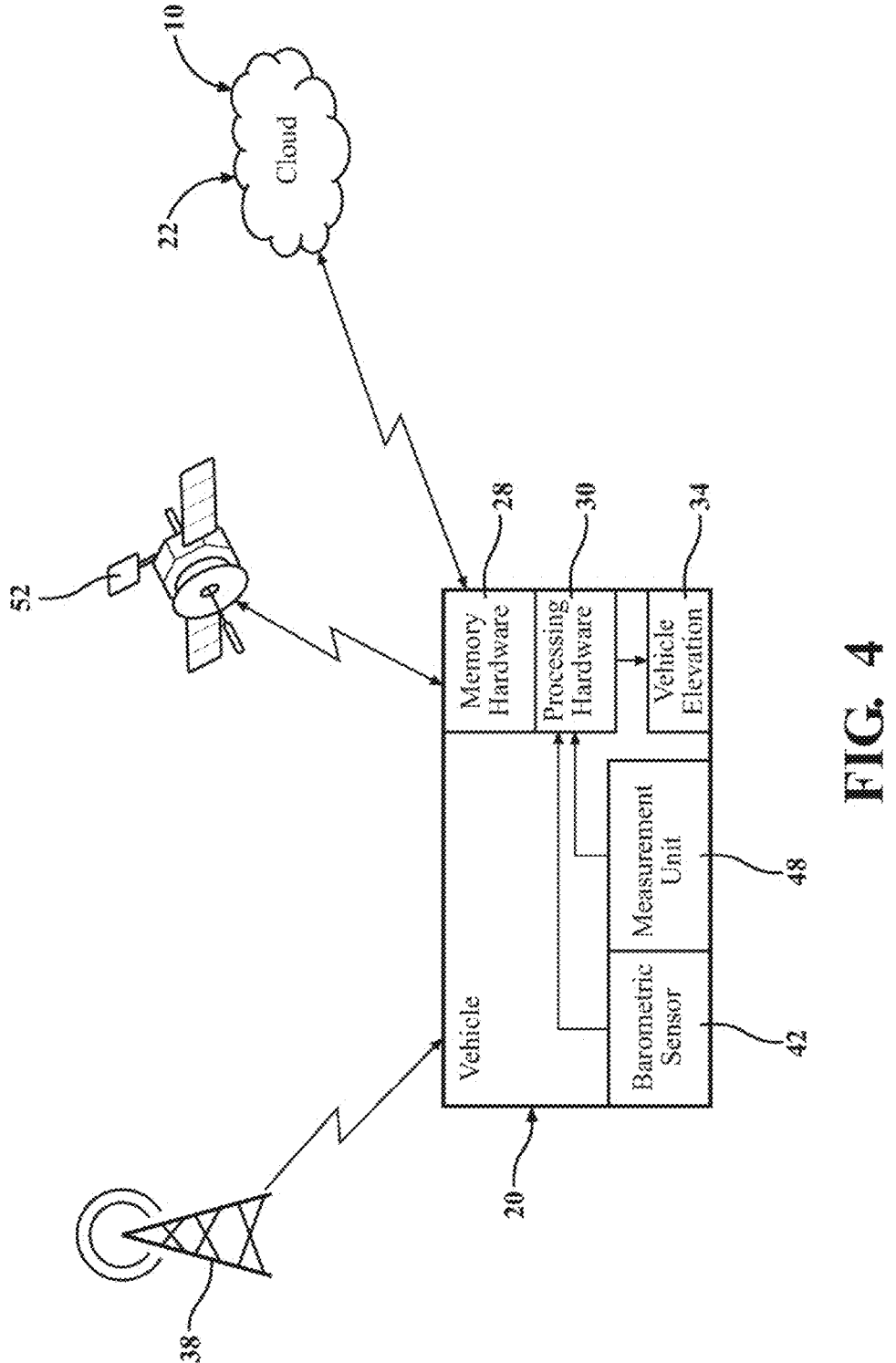
FIG. 4 is a schematic representation of a vehicle in communication with the Kalman filter of FIG. 2 for use in determining vehicle position on a stacked roadway.

While the stacked roadway detection system 10 will be described and shown hereinafter as being stored and executed by a cloud-based computer 22, the stacked roadway detection system 10 could alternatively be stored and executed on-board the vehicle 20. Specifically, as shown in FIG. 4, the vehicle 20 includes memory hardware 28 and processing hardware 30, which could be used to store and execute the stacked roadway detection system 10 for the particular vehicle 20. As will be described in detail below; however, the stacked roadway detection system 10 is used in conjunction with multiple vehicles 20 simultaneously and, therefore, must process significant volumes of data and be in communication with multiple vehicles 20 at the same time. Accordingly, the stacked roadway detection system 10 may be stored and executed by a cloud-based computer 22 or another remotely located computer in communication with the vehicles 20.

Figure 2:
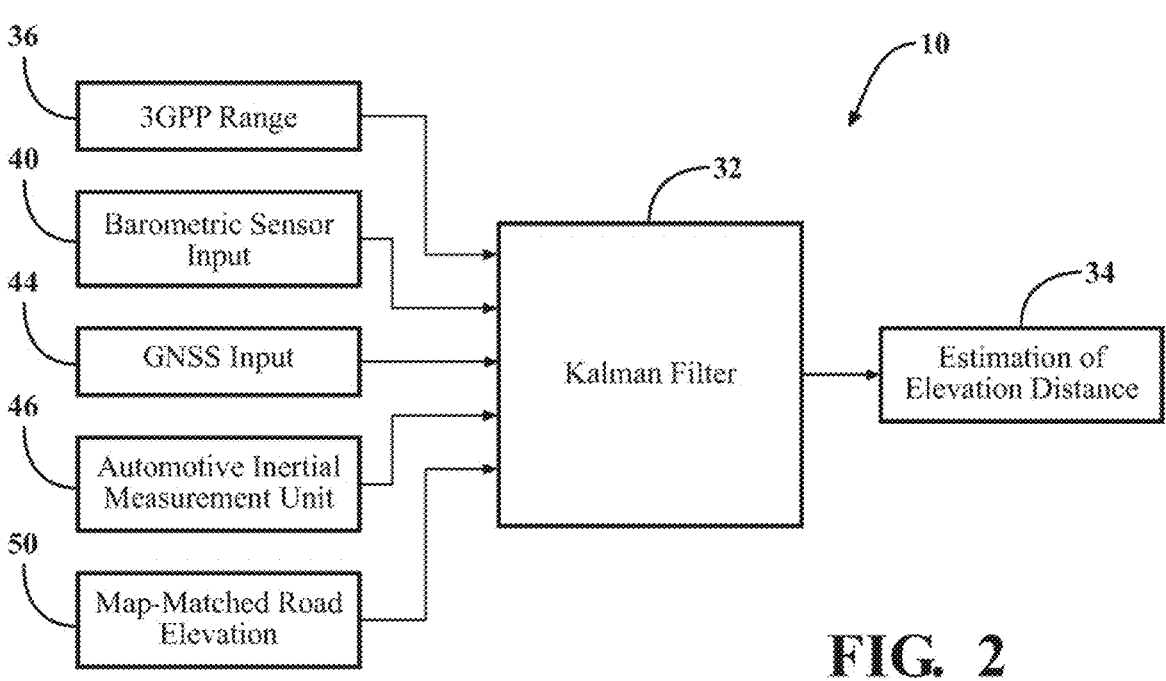
FIG. 2 is a block diagram showing a Kalman filter for use in determining vehicle elevation in accordance with the principles of the present disclosure.

With particular reference to FIG. 2, the stacked roadway detection system 10 is shown as including a Kalman filter 32 used to provide an estimate of vehicle elevation distance 34, which is the World Geodetic System-84 (WGS-84) height above ellipsoid (meters). The Kalman filter 32 utilizes Kalman filtering (linear quadratic estimation (LQE)), which is an algorithm that uses a series of measurements observed over time and produces estimates of unknown variables that tend to be more accurate than those based on single measurements alone. The Kalman filtering or LQE estimates the unknown variables by estimating a joint probability distribution over the variables for each of a series of timeframes over the course of the observed time.

As shown in FIG. 2, the Kalman filter 32 receives a series of inputs for use by the Kalman filter 32 in determining the estimate of vehicle elevation distance 34. For example, the Kalman filter 32 receives 5G 3GPP wireless range data 36 from a cellular tower 38, barometric sensor data 40 from a barometric sensor 42 associated with each vehicle 20, Global Navigation Satellite System (GNSS) data 44, auto-motive inertial data 46 from a measurement unit 48 associated with each vehicle 20, and map-matched road elevation data 50. The foregoing inputs 36, 40, 44, 46, 50 are used by the Kalman filter 32 to determine the vehicle elevation distance 34 and, in so doing, can determine the roadway on which the particular vehicle 20 is traveling.

For example, in the stacked roadway 12 of FIG. 1, the Kalman filter 32 will utilize the inputs 36, 40, 44, 46, 50 to determine if the vehicle 20 is on the first roadway 14, the second roadway 16, or the third roadway 18. The foregoing information may be used by the vehicle 20—via the processing hardware 30—to determine if the roadway on which the vehicle 20 is traveling is passable by the particular vehicle 20 and, if not, may recommend a different route. For example, if a height of the vehicle 20 is greater than a clearance for an overpass crossing the particular roadway on which the vehicle 20 is traveling, the processing hardware 30—based on the estimation of vehicle elevation distance 34—may recommend taking a different route that can accommodate the height of the vehicle 20. If the vehicle 20 is an autonomously driven vehicle, the processing hardware 30 may alert vehicle occupants and/or may automatically take a different route based on the estimation 34.

The 5G 3GPP wireless range data 36 may be used by the Kalman filter 32 in determining a position of the vehicle 20. Namely, if the vehicle 20 and/or a cellular device such as mobile phone or tablet associated with one or more occupants traveling in the vehicle 20 is in communication with one or more cellular towers 38, the cellular tower(s) 38 knows a location of the vehicle 20. Namely, the one or more cellular towers 38 must transmit data to the vehicle 20 and/or to a cellular device traveling within the vehicle 20. Further, the vehicle 20 and/or a cellular device traveling within the vehicle 20 must transmit data to the one or more cellular towers 38. Accordingly, the one or more cellular towers 38 knows a position of the vehicle 20, which may be used by the Kalman filter 32 as an input for determining the estimation of elevation distance 34. It should be noted that while the range data 36 is described and shown as being 5G 3GPP data, the cellular data input to the Kalman filter 32 from one or more cellular towers 38 could be 3G or 4G data. The location data from the cellular tower(s) 38 may be directly sent to the Kalman filter 32 or could be transmitted from the memory hardware 28 and/or the processing hardware 30 associated with each vehicle 20 to the Kalman filter 32.

The barometric sensor 42 associated with each vehicle 20 may be a preexisting sensor that is found in conventional vehicles. Namely, conventional vehicles may utilize a barometric sensor 42 to tune a propulsion system of the vehicle as a function of altitude. Accordingly, providing the Kalman filter 32 with an input from an already existing sensor (i.e., a barometric sensor 42) provides the Kalman filter 32 with information that is already being detected and, thus, does not result in additional cost or complexity in manufacturing and maintaining the vehicle 20. Information from the barometric sensor 42 relates to the elevation of the vehicle 20, which may be stored in the memory hardware 28 of the particular vehicle 20 and may be sent to the Kalman filter 32 by the memory hardware 28 and/or the processing hardware 30. The elevation data for the vehicle 20—as detected by the barometric sensor 42—may be used as an input to the Kalman filter 32 for use by the Kalman filter 32 in determining the estimation of elevation distance 34.

The 5G 3GPP range data 36 and the barometric data 40 may be assigned common timestamps by the cloud-based computer 22. For example, the 5G 3GPP range data 36 and the barometric data 40 may be assigned common timestamps per an established time-sync method such as IEEE 802.1as gPTP. This way, the Kalman filter 32 is using data from the same timeframe when estimating the elevation distance 34.

The GNSS input 44 may provide the Kalman filter 32 with data relating to a position of the vehicle 20, as detected by a satellite 52. The position of the vehicle 20 may be transmitted to the Kalman filter 32 directly from the satellite 52 or may be sent from the memory hardware 28 and/or the processing hardware 30 of each vehicle 20 to the Kalman filter 32. The information relating to the position of the vehicle 20 may be used as an input by the Kalman filter 32 for use in determining the estimation of elevation distance 34.

The automotive inertial data 46 may include one or more of the pitch, roll, and yaw (radians/second) of the vehicle 20 and may be detected by the measurement unit 48 associated with each vehicle 20. The inertial data 46 may be used by the Kalman filter 32 as an input for use by the Kalman filter 32 in determining the estimation of elevation distance 34.

The map-matched road elevation data 50 relates to current road conditions that are known based on the current position of the vehicle 20. The known, current road conditions are based on previous estimates of the elevation distance 34 made by the Kalman filter 32 at the particular location for other vehicles 20 that are traveling on or have traveled on the roadway on which the vehicle 20 is traveling. For example, the vehicle 20 knows its location based at least on communication with one or more cellular towers 38 and/or the satellite 52. Further, the cloud-based computer 22 knows the location of the vehicle 20, as the cloud-based computer 22 is in communication with the vehicle 20. The cloud-based computer 22—based on previous estimates of vehicle elevation distance 34 from other vehicles 20 traveling on the same roadway—may provide this information to the Kalman filter 32 for use by the Kalman filter 32 in determining the precise location of the vehicle 20 when traveling on a stacked roadway, as shown in the example of FIG. 1.

The cloud-based computer 22 and, more particularly, the Kalman filter 32, may utilize the foregoing inputs 36, 40, 44, 46, 50 in determining the estimate of elevation distance 34. Specifically, the Kalman filter 32 may combine the inputs 36, 40, 44, 46, 50 to provide an accurate estimate of elevation distance 34. The estimate of elevation distance 34 may be used to warn vehicle occupants and/or change a path-of-travel of the vehicle 20 should the cloud-based computer 22 determine that, for the particular vehicle 20, the roadway is impassable due to low overpasses and the like. Further, the estimate of elevation distance 34 may be used to warn when a vehicle 20 is heading in the wrong direction on a roadway and/or to provide emergency personnel with an exact location of a vehicle 20 in the event of a collision or car trouble.

Operating the cloud-based computer 22 and the associated Kalman filter 32 is processing-intensive due to the number of inputs 36, 40, 44, 46, 50 for each vehicle 20 as well as the number of vehicles 20 for which the cloud-based computer 22 provides an estimation of elevation distance 34. Accordingly, efficiency of the Kalman filter 32 is necessary to allow the Kalman filter 32 to properly function.

A crowd sourcing mechanism may be used to improve the efficiency of the Kalman filter 32. As described, the Kalman filter 32 consumes multiple sources of input information including 5G 3GPP range data 36, barometric sensor data 40, GNSS input data 44, automotive inertial measurement data 46, and map-matched elevation data 50. Therefore, convergence rate and processing overhead is significant. The purpose of the Kalman Filter 32 is to minimize the error rate as in conventional cost function optimization. Accordingly, more data from a plurality of vehicles 20 will reduce the variance with respect to estimation of elevation distance 34 and expedite the convergence of the Kalman Filter 32 by minimizing the error.

Principal Component Analysis (PCA) may be employed in an effort to only include those features that add significance in terms of improving the efficiency of Kalman filter 32 and contribute to variance in estimation of elevation distance 34. In short, PCA is concerned with identifying and using only relevant data to reduce computing time. In so doing, PCA allows the Kalman filter 32 to provide real-time estimations of elevation distance 34 so that clearance estimates, exact vehicle location, and direction of travel of a particular vehicle 20 can be determined in real-time. The cloud-based computer 22 utilizes PCA to continually hone the Kalman filter 32 based on previous estimations of distance 34 to improve the accuracy and speed with which the Kalman filter 32 provides an estimation of elevation distance 34.

Figure 3:
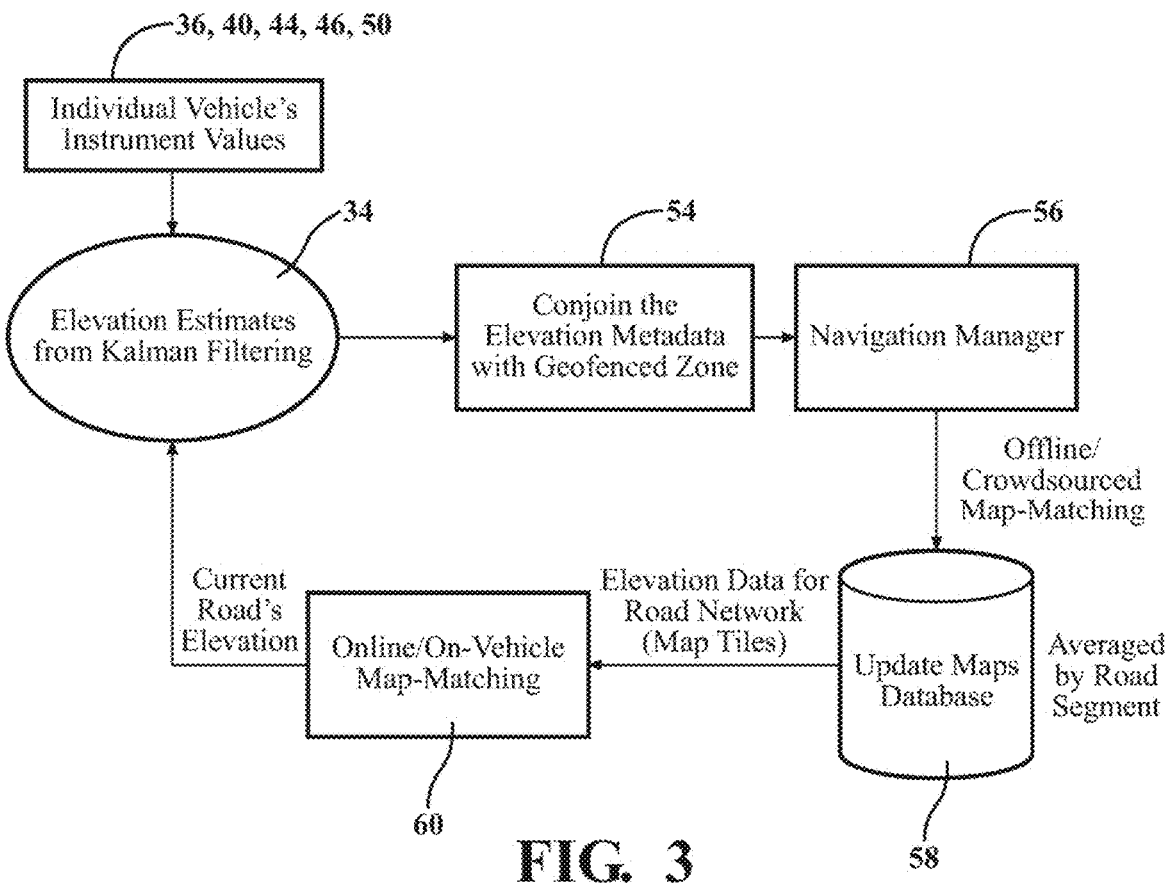
FIG. 3 is a block diagram detailing use of vehicle elevation data from the Kalman filter of FIG. 2 for use in updating navigational databases.

With particular reference to FIG. 3, a block diagram showing how the estimations of elevation distance 34 produced by the Kalman filter 32 may be used to update maps stored in the memory hardware 24 of the cloud-based computer 22 and/or in the memory hardware 28 of the individual vehicles 20. Such maps are useful in providing a driver or a controller of an autonomously driven vehicle with accurate information pertaining to the exact location of the vehicle 20 including clearance heights of overpasses, direction of travel, etc.

As previously described, the various inputs 36, 40, 44, 46, 50 from the individual vehicles 20 are directed into the Kalman filter 32 to determine an estimation of elevation distance 34. The estimation of elevation distance 34 for a plurality of vehicles 20 may be conjoined within a geofenced zone at 54. For example, the Kalman filter 32 may provide an accurate estimate for an elevation of the second roadway 16. The tuple of geofenced zone and elevation estimates $\{G\ (x,y),\ E_n\}$ may be provided to a navigation manager at 56 for use by the navigation manager 56 in updating a maps database at 58. The updated maps database 58 is updated at 58 by the cloud-based computer 22 and is based on crowdsourced data. Namely, a plurality of estimates of elevation distance 34 from a plurality of vehicles 20 at a given geofenced location are provided to the navigation manager at 56, which is used by the cloud-based computer 22 at 58 to update the maps database at 58. The various estimates of elevation distance 34 may be matched to a given roadway by using a discrete Hidden Markov Model. The Hidden Markov Model may be used to match each estimate of elevation distance 34 to a single roadway to resolve ambiguity around stacked roadways. The map-matching model may be continually refined by the cloud-based computer 22 on a regular frequency using incoming crowd-sourced data from vehicles 20.

As shown in FIG. 3, this updating of the maps database at 58 is done by road segment in a geofenced location. These geofenced locations or map segments may be referred to as "map tiles" that may be stitched together to provide elevation data for a road network. Specifically, the average vehicle elevation along all roadways may be taken by discretizing the roadways into geo-indices (i.e., cells or tiles). The average vehicle elevation within each cell or tile may be determined. Once the average vehicle elevation within each cell or tile is determined, the cloud-based computer 22 will apply lateral smoothing and longitudinal smoothing along the elevation map to further reduce noise.

This road-specific elevation map will be updated at regular intervals as new telemetry data arrives (i.e., new estimation of elevation distance 34 data from traveling vehicles 20). The road-specific elevation map may serve as an input into the Kalman filter 32, as shown in FIG. 3, to improve confidence and reduce noise. Finally, the updated map information may be provided to the vehicle 20 at 60.

As described, the stacked roadway detection system 10 utilizes various inputs to a Kalman filter 32 including 5G 3GPP range data 36, barometric sensor data 40, GNSS data 44, automotive inertial data 46, and map-matched data 50 to determine an estimation of elevation distance 34 for a vehicle 20. The estimate of elevation distance 34 may be used to determine an exact location of a vehicle 20—including when the vehicle 20 is traveling on a stacked roadway 12. Further, the estimate of elevation distance 34 for a plurality of vehicles 20 may be used over time to generate and continually update map data and, further, to refine the Kalman filter 32.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system comprising:
   data processing hardware; and
   memory hardware in communication with the data processing hardware, the memory hardware storing instructions that when executed on the data processing hardware cause the data processing hardware to perform operations comprising:
      inputting a plurality of inputs comprising cellular range data, barometric sensor data, GNSS data, and automotive inertial data into a Kalman filter, the plurality of inputs related to a location of a vehicle on one of a plurality of roadway segments of a stacked roadway, the plurality of roadway segments comprising a lowermost roadway segment, a middle roadway segment, and a highest roadway segment;
      outputting from the Kalman filter an estimated elevation of the vehicle based on the cellular range data, the barometric sensor data, the GNSS data, and the automotive inertial data; and
      determining that the vehicle is located on the one of the plurality of roadway segments based on the estimated elevation of the vehicle.

2. The system of claim 1, further comprising a barometric sensor associated with the vehicle.

3. The system of claim 2, wherein the barometric sensor is in communication with the data processing hardware and provides the data processing hardware with the barometric sensor data, the barometric sensor data indicative of an altitude of the vehicle.

4. The system of claim 1, wherein the automotive inertial data includes at least one of pitch, roll, and yaw.

5. The system of claim 1, wherein inputting the cellular range data, the barometric sensor data, the GNSS data, and the automotive inertial data into the Kalman filter, includes inputting the cellular range data, the barometric sensor data, the GNSS data, and the automotive inertial data for the vehicle traveling within the one of the plurality of roadway segments of the stacked roadway.

6. The system of claim 5, further comprising comparing the estimated elevation of the vehicle output by the Kalman filter with other estimated elevations output by the Kalman filter for other vehicles traveling within the one of the plurality of roadway segments of the stacked roadway.

7. The system of claim 6, further comprising providing the comparison to the Kalman filter to refine the Kalman filter.

8. The system of claim 6, further comprising updating a map database based on the comparison.

9. A system comprising:
   data processing hardware; and
   memory hardware in communication with the data processing hardware, the memory hardware storing instructions that when executed on the data processing hardware cause the data processing hardware to perform operations comprising:
      providing a plurality of inputs to a Kalman filter, the inputs related to a location of a vehicle on one of a plurality of roadway segments of a stacked roadway, the plurality of roadway segments comprising a lowermost roadway segment, a middle roadway segment, and a highest roadway segment;
      estimating an elevation of the vehicle on the stacked roadway using the Kalman filter based on the plurality of inputs;
      determining that the vehicle is located on the one of the plurality of roadway segments based on the estimated elevation of the vehicle;
      providing a plurality of estimated vehicle elevations for a plurality of other vehicles traveling on the one of the plurality of roadway segments of the stacked roadway to the Kalman filter;
      comparing the estimate of elevation of the vehicle to the plurality of estimated vehicle elevations for the plurality of other vehicles; and
      refining the Kalman filter based on the comparison.

10. The system of claim 9, wherein one of the plurality of inputs to the Kalman filter is cellular range data.

11. The system of claim 9, wherein one of the plurality of inputs to the Kalman filter is barometric sensor data.

12. The system of claim 9, wherein one of the plurality of inputs to the Kalman filter is GNSS data.

13. The system of claim 9, wherein one of the plurality of inputs to the Kalman filter is automotive inertial data.

14. The system of claim 13, wherein the automotive inertial data includes at least one of pitch, roll, and yaw.

15. The system of claim 9, further comprising updating a maps database based on the comparison.

16. A system comprising:
   data processing hardware; and
   memory hardware in communication with the data processing hardware, the memory hardware storing instructions that when executed on the data processing hardware cause the data processing hardware to perform operations comprising:
      inputting a plurality of inputs comprising cellular range data, barometric sensor data, GNSS data, and automotive inertial data into a Kalman filter, the plurality of inputs related to a location of a vehicle on one of a plurality of roadway segments of a stacked roadway, the plurality of roadway segments comprising a lowermost roadway segment, a middle roadway segment, and a highest roadway segment;

estimating an elevation of the vehicle on the stacked roadway using the Kalman filter based on the cellular range data, the barometric sensor data, the GNSS data, and the automotive inertial data;

determining that the vehicle is located on the one of the plurality of roadway segments based on the estimated elevation of the vehicle;

providing a plurality of estimated vehicle elevations for a plurality of other vehicles traveling on the one of the plurality of roadway segments of the stacked roadway to the Kalman filter;

comparing the estimated elevation of the vehicle to the plurality of estimated vehicle elevations for the plurality of other vehicles; and refining the Kalman filter based on the comparison.

17. The system of claim 16, wherein the automotive inertial data includes at least one of pitch, roll, and yaw.

18. The system of claim 16, further comprising updating a maps database based on the comparison.

19. The system of claim 16, further comprising matching the estimated vehicle elevations for the plurality of other vehicles to the one of the plurality of roadway segments.

20. The system of claim 19, wherein matching the estimated vehicle elevations for the plurality of other vehicles to one of the plurality of roadway segments includes using a Markov Model.

\* \* \* \* \*